United States Patent [19]

Gee et al.

[11] Patent Number: 5,307,406
[45] Date of Patent: Apr. 26, 1994

[54] ISDN POWER SOURCE DETECTION CIRCUIT

[75] Inventors: Timothy W. Gee, Cary; James W. Sylivant, Apex; Larry S. Shannon, Jr., Raleigh, all of N.C.; Alan M. Bentley; Randall S. Nelson, both of Rochester, Minn.; Ray A. Luechtefeld; Thanh T. Nguyen, both of Rochester, Minn.

[73] Assignee: International Business Machines Corporation, Armonk, N.Y.

[21] Appl. No.: 810,733

[22] Filed: Dec. 18, 1991

[51] Int. Cl.$^5$ .................................. H04M 19/00
[52] U.S. Cl. .................................. 379/413; 379/348;
   328/151; 307/311
[58] Field of Search ................. 379/413, 348; 307/350,
   307/311; 328/115, 151

[56] References Cited

U.S. PATENT DOCUMENTS

| | | | |
|---|---|---|---|
| 4,115,830 | 9/1978 | Stieber | 307/311 X |
| 4,525,874 | 6/1985 | Baiies | 455/600 |
| 4,686,696 | 8/1987 | Lynch | 379/22 |
| 4,852,152 | 7/1989 | Honick | 379/413 X |
| 4,899,044 | 2/1990 | Hansen et al. | 250/227 |
| 5,105,461 | 4/1992 | Tsurusaki et al. | 379/382 |

*Primary Examiner*—James L. Dwyer
*Assistant Examiner*—Paul A. Fournier
*Attorney, Agent, or Firm*—Stephen T. Keohane

[57] ABSTRACT

In an ISDN communications system, a remote station power detector circuit comprises a capacitor connected between center taps of transformers on the receive and transmit pairs of conductors. The capacitor stores energy delivered from a central DC power source. Two serially-connected opto-couplers form a discharge path for the capacitor. The first opto-coupler is periodically driven on to partially complete the discharge path. If the capacitor charge exceeds a predetermined minimum, the second opto-coupler will then be driven on, providing a logic level output usable by the remote station. Power consumption is minimized by the use of large resistors in series with the capacitor while reliable power detection is achieved by detecting accumulated charge on the capacitor. Dielectric isolation is provided through the use of opto-coupler circuits.

6 Claims, 3 Drawing Sheets

ISDN POWER SOURCE DETECTION CIRCUIT

BACKGROUND OF THE INVENTION

I. Field of the Invention

The present invention relates to ISDN communications systems and, more particularly, to a power detection circuit located at a remote station which consumes little power while providing good isolation between the remote station logic and the transmission lines.

II. Prior Art

A major step in the evolution of common carrier facilities from an analog environment to a completely digital environment lies in the implementation of an integrated services digital network (ISDN) wherein a digital channel is provided directly to the end user. In such a network, the equipment on the user's premises, such as a digital telephone or data terminal, generates a digital signal for being transmitted directly to the common carrier's switching office over local loops that are engineered to carry digital signals. The interface network is documented in the form of standards composed by the International Telegraph and Telephone Consultative Committee (CCITT) for international standards and by the American National Standards Institute (ANSI) for U.S. standards.

Similar to a standard analog telephone system, ISDN provides power to remote stations (on the user's premises) for powering the user's equipment. As can be seen in the simplified block diagram in FIG. 1, an ISDN network 10 utilizes two transmission line pairs to each remote station: a transmit pair 16 for conveying data to the remote station 12, such as a data terminal equipment (DTE), from a central office 14 and a receive pair 18 for conveying data from the remote station 12 to the central office 14. Because both the transmit pair 16 and the receive pair 18 are terminated by transformers 20, DC power is provided by a power source 24 in the central office 14 to the remote station 12 via the center terminal 22 of each transformer 20. In this way, the differential current (and voltage) across each pair is zero.

In order to implement the full potential of ISDN, the CCITT and ANSI standards define an elaborate state machine. This state machine integrates the physical world (i.e., wires, voltages, currents) into an abstract world of virtual communication links and networks. To fully pass through all the required and optional states, the hardware must be aware that it is currently connected to a functioning ISDN line, and must be capable of detecting when a connection has been physically interrupted. The required method of doing this is to use a power sensor 26 to determine if power is being supplied over the transmission lines. This method is particularly practical when the user's equipment does not use the power provided over the ISDN lines but rather consumes the user's own power. A problem arises, however, in that the user is severely limited by the international and U.S. standards as to the amount of power which can be consumed by the power sensor 26 in assessing the availability of a functioning ISDN network. Typically, the power sensor circuit 26 cannot consume more than 3 milliwatts (mW), the power consumption limit varying slightly depending upon which standard is referenced.

In addition, because of the threat of lightning striking the ISDN lines or the possibility of ISDN and high power lines crossing, the power sensor circuit 26 must provide a high degree of voltage isolation between the ISDN lines and the remote station logic. Requirements for isolation range from 1500 to 3500 Volts (V), again depending upon which standard is referenced.

In the past, transformers have been used as a means of providing a high degree of isolation for data signals, but are not suitable for DC applications.

Electrical devices such as opto-couplers have been used to meet the required dielectric isolation requirements but typically consume more than 3 mw. To operate effectively and consistently, opto-couplers require at least 1 milliams (mA) of drive current, preferably 10 mA, if detection over temperature extremes and over the life of the opto-coupler is desired. As voltage of the central office power supply 24 ranges from 24V to 56.5V, the maximum current that is allowed to flow through the detection circuit without exceeding the power consumption limit ranges from 22.6 to 56.5 micro-amperes, respectively. As a result, the use of opto-couplers in such a remote station application requires much more than the 3 milliwatts of power consumption that ISDN standards allow.

Therefore, it is desirable to have a method for detecting power at an ISDN remote station that consumes little power ($<3mW$) and provides a high degree of isolation ($>3000V$).

SUMMARY OF THE INVENTION

In an ISDN communications system, a remote station power detector circuit consumes little power while providing a high degree of isolation between the remote station logic and the ISDN transmission lines. A capacitor in series with a resistor is connected between center taps of transformers on the receive and transmit pairs of conductors. The capacitor stores energy delivered from a central DC power source. Two serially-connected opto-couplers form a discharge path for the capacitor. The first opto-coupler acts as a switch which is periodically driven on to partially complete the discharge path. If the capacitor charge exceeds a predetermined minimum, the second opto-coupler will then be driven on, providing a logic level output usable by the remote station's logic circuitry.

Power consumption is minimized by the use of large resistors in series with the capacitor while reliable power detection is achieved by detecting accumulated charge on the capacitor. Dielectric isolation is provided through the use of opto-coupler circuits.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
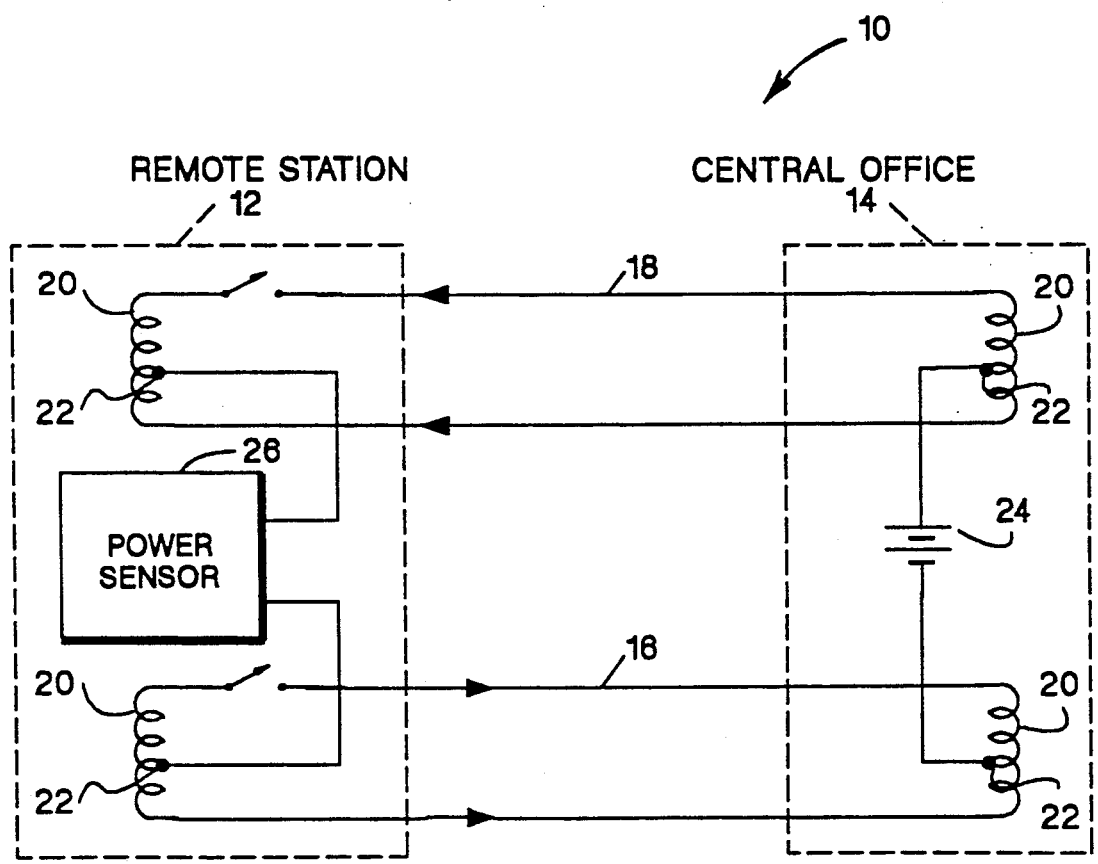
FIG. 1 is a simplified block diagram of an ISDN network well-known in the art.
Figure 2:
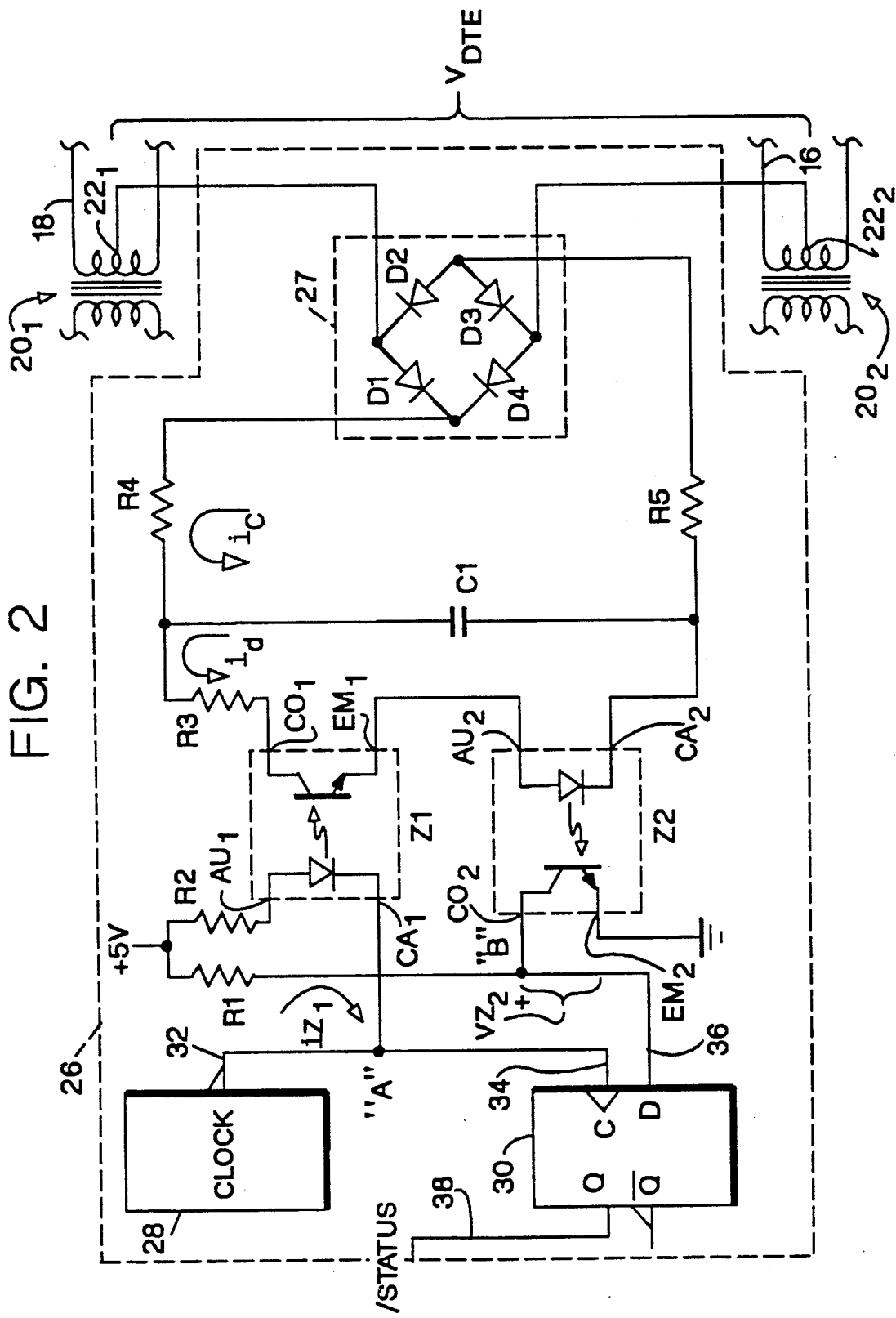
FIG. 2 is a schematic diagram of a first embodiment of the power sensor circuit of the present invention.

FIG. 2 illustrates a schematic diagram of a first embodiment of the power sensor circuit 26 of the present invention. Power sensor circuit 26 comprises a full-wave rectifier 27 (having diodes D1, D2, D3 and D4), five resistors R1, R2, R3, R4 and R5, a capacitor C1, two opto-couplers Z1 and Z2, a clock 28 and a D flip-flop 30. The power sensor circuit 26 is configured so that the Z2 opto-coupler drive current is large enough to be reliably detected while keeping the average power consumption below 3mW. This is accomplished by maintaining the series resistance between two center terminals $22_1$, $22_2$ of transformers $20_1$, $20_2$ to no less than 1.064 Meg-ohms.

In particular, full-wave rectifier 27, R4, C1 and R5 are connected in series between the two center terminals $22_1$, $22_2$. Connected in parallel with C1 are opto-couplers Z1 and Z2 and current limiting resistor R3, R3 being connected between C1 and the collector $Co_1$ of Z1, the emitter $Em$ of Z1 being connected to the anode $An_2$ of Z2 and the cathode $Ca_2$ of Z2 being connected to the remaining lead of C1. Pull-up resistors R1 and R2 are connected between a +5V power supply and, respectively, collector $Co_2$ of Z2 and anode $An_1$ of Z1. The output 32 of clock 28 is connected to both the cathode $Ca_1$ of Z1 and input 34 of D flip-flop 30. Input 36 of D flip-flop 30 is connected to both $Co_2$ and R1.

The power detection circuit 26, which is normally mounted on a printed circuit board (PCB), operates as follows. Power is supplied by the central office so that a voltage $v_{DTE}$ (24V to 56.5V) appears between center terminals $22_1$ and $22_2$ and, consequently, across full-wave rectifier 27, R4, C1 and R5. The full-wave rectifier 27 allows the sensing circuitry to sense voltages of either polarity, positive or negative, by ensuring that current $i_c$ through R4, C1 and R5 can flow in one direction only. The resistor and capacitor values are selected so that current $i_c$ through R4, C1 and R5 is minimal (thereby consuming minimal power) as C1 slowly charges to the voltage level existing over center terminals $22_1$, $22_2$ ($v_{DTE}$). During this charging period, opto-coupler Z1 is not "turned on", or conducting, as clock output 32 is "high" thereby keeping Z1 in a non-conducting state.

After a sufficient time has passed, i.e., after C1 has charged to substantially the same voltage level as $v_{DTE}$, clock output 32 goes "low" so that sufficient current $i_{z1}$ may flow between $An_1$ and $Ca_1$ thereby turning on Z1. Clock output 32 is also routed to D flip-flop strobe 34. This allows the clock to latch the voltage at the input of the D flip-flop 36 and present a subsequent logical output 38. Such a topology allows the clock to initiate a "read" of the line status with a falling edge and record the results of that read with the rising edge. When Z1 is in a conducting state (indicating connection to an operational ISDN line), sufficient current flows through Z2 thereby turning it on and completing the discharge path for the energy stored in C1. While Z2 is on, the collector voltage at $CO_2$ is at a logic low level. When clock output 32 returns to a high state, the D flip-flop 30 is strobed via the positive edge at the strobe input 34. The low logic state of $CO_2$ is indicated at output 38. With clock output 32 at a high state, Z1 is turned off, readying the circuit for another cycle.

The duty cycle of clock 28 is chosen so that clock output 32 is high for a long enough time for C1 to charge to a sufficiently high voltage level and is low for a sufficient amount of time for Z1 and Z2 to completely turn on. The value of R3 is selected so that $i_d$ is great enough to consistently turn on Z2 (at least 10mA).

Q output 38 of D flip-flop 30 (/STATUS signal) provides the status of the ISDN network to a CPU or the like (not shown). For example, if there is a functioning ISDN system, i.e., $v_{DTE} > 24V$, Z2 will turn on at substantially the same time as the D flip-flop 30 is set up to be strobed at C input 34. When Z2 turns on, the voltage level at $Co_2$ drops to substantially the same level as $Em_2$, or ground. Thus, the D input 36, which is the same as the voltage across the collector $Co_2$ and the emitter $Em_2$ of Z2 ($v_{Z2}$), will be substantially equal to zero when D input 36 is strobed through D flip-flop 30 to Q output 38. Therefore, a low output at /STATUS indicates a functioning ISDN network.

On the other hand, where there is a non-functioning ISDN network, $i_d$ is insufficient to turn on Z2. Because Z2 cannot turn on, $v_{Z2}$ (and D input 36) remains high as it is pulled up by R1. Thus, a high output on the /STATUS bit indicates a non-functioning ISDN network.

Figure 3:
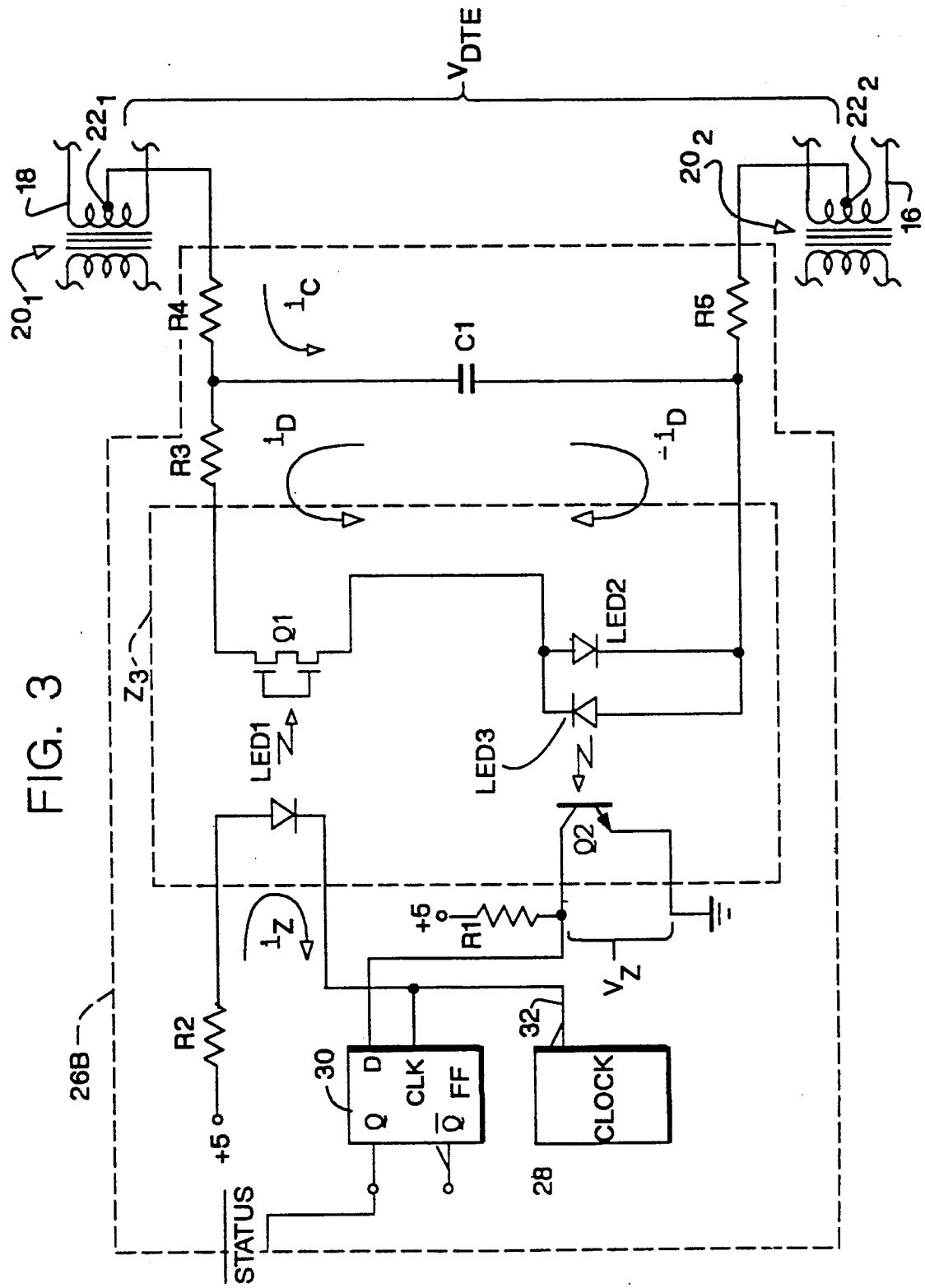
FIG. 3 is a schematic diagram of a second embodiment of the power sensor circuit of the present invention.

FIG. 3 illustrates a schematic diagram of a second embodiment of the power sensing circuit of the present invention. The power sensing circuit 26B is quite similar to the power sensing circuit 26 of the first embodiment having five resistors R1, R2, R3, R4 and R5, capacitor C1, clock 28 and D flip-flop 30. In addition, circuit 26B comprises opto-coupler Z3 (replacing Z1, Z2 and full-wave rectifier 27). Opto-isolator Z3, in contrast to the tandem Z1 and Z2 of the first embodiment, is bidirectional. Instead of utilizing solely bipolar technology (which is unidirectional), Z3 utilizes MOSFET technology for one half (Q1) of its transistor portion and bipolar technology for the remaining half (Q2) of its transistor portion. Because Q1 is a MOSFET, current can flow in either the positive direction ($i_d$) or the negative direction ($-i_d$) when it is turned on by LED1. Two LEDs, LED2 and LED3, connected in parallel allow bidirectional current flow ($i_d$, $-i_d$). Depending upon the polarity of $v_{DTE}$, either LED2 or LED3 will turn on bipolar Q2. In this manner, the full-wave rectifier of the first embodiment is not needed.

Thus, the present invention provides a circuit for storing energy from the ISDN power source by charging a capacitor over a long enough period of time so that the capacitor can reach a voltage large enough to supply a short pulse of high current to the light-emitting diode (LED) of an opto-coupler. This current is large enough to reliably cause switching in the transistor portion of the opto-coupler. This duty cycle approach to ISDN power detection allows the power consumed by the detection circuitry to be kept below the 3mW limit while at the same time providing sufficient drive to the opto-coupler's drive LED.

While the invention has been particularly shown and described with reference to preferred embodiments thereof, it will be understood by those skilled in the art that various other changes in form and detail may be made without departing from the spirit and scope of the invention.

What is claimed is:

1. For use in an integrated services digital network (ISDN) having a power source, at least one data terminal equipment which is to receive power from the power source and four conductors, two transmit conductors and two receive conductors, for connecting the power source to the data terminal equipment, the data terminal equipment having first and second transformers for being connected to the two transmit conductors and two receive conductors, respectively, each transformer having a center tap for being connected to a bipolar power sensor circuit for being used at the data terminal equipment comprising:

means for connecting to the center tap of the first and second transformers;

energy storage means connected to the transformer center tap connecting means for accumulating either positively charged or negatively charged energy delivered from the power source;

means for periodically interrogating the energy storage means to produce an output signal, the interrogating means comprising first and second bi-directional opto-couplers connected to the energy storage means for selectively allowing the positively or negatively charged accumulated energy to discharge therethrough thereby forming a discharge path for the positively or negatively charged accumulated energy, the first bi-directional opto-coupler comprising a metal oxide semiconductor field effect transistor (MOSFET) so that current from the positively or negatively charged accumulated energy may flow therethrough in either direction; and means responsive to the output signal level for generating a status signal indicating the presence of power delivered from the power source when the output signal level exceeds a predetermined minimum, the status signal generating means being connected to the MOSFET bi-directional opto-coupler and the second bi-directional opto-coupler.

2. The power sensor circuit defined in claim 1 wherein the status signal further indicates the absence of power when the output signal level does not exceed the predetermined minimum.

3. The power sensor circuit defined in claim 1 wherein the interrogating means further comprises a clock for periodically triggering the first opto-coupler to allow the accumulated energy to discharge therethrough.

4. A data terminal equipment for use in an integrated services digital network (ISDN) having a power source and four conductors, two transmit conductors and two receive conductors, for connecting the power source to the data terminal equipment, the data terminal equipment comprising first and second transformers for being connected to the two transmit conductors and two receive conductors, respectively, each transformer having a center tap for being connected to a bipolar power sensor circuit having means for connecting to the center tap of the first and second transformers, energy storage means connected to the transformer center tap connecting means for accumulating either positively charged or negatively charged energy delivered from the power source, means for periodically interrogating the energy storage means to produce an output signal, the interrogating means comprising first and second bi-directional opto-couplers connected to the energy storage means for selectively allowing the positively or negatively charged accumulated energy to discharge therethrough thereby forming a discharge path for the positively or negatively charged accumulated energy, the first bi-directional opto-coupler comprising a metal oxide semiconductor field effect transistor (MOSFET) so that current from the positively or negatively charged accumulated energy may flow therethrough in either direction, and means responsive to the output signal level for generating a status signal indicating the presence of power delivered from the power source when the output signal level exceeds a predetermined minimum, the status signal generating means being connected to the MOSFET bi-directional opto-coupler and the second bi-directional opto-coupler.

5. The data terminal equipment defined in claim 4 wherein the status signal further indicates the non-presence of power when the output signal level does not exceed the predetermined minimum.

6. The data terminal equipment defined in claim 4 wherein the interrogating means further comprises a clock for periodically triggering the first opto-coupler to allow the accumulated energy to discharge therethrough.

* * * * *